United States Patent [19]

Hall, III et al.

[11] Patent Number: 5,307,905
[45] Date of Patent: May 3, 1994

[54] BRAKE APPLY WITH IMPROVED REACTION

[75] Inventors: Arthur Hall, III, Cicero, Ind.; Donald F. Scherer, Redford, Mich.

[73] Assignee: General Motors Corporation, Detroit, Mich.

[21] Appl. No.: 23,261

[22] Filed: Feb. 25, 1993

[51] Int. Cl.⁵ .................. F16D 55/26; F15B 9/10
[52] U.S. Cl. .................. 188/72.6; 188/72.7; 188/106 F; 91/369.1
[58] Field of Search .......... 188/71.5, 72.4, 72.5, 188/72.6, 72.7, 72.8, 366, 367, 106 F, 106 P; 91/369.1, 391 R

[56] References Cited

U.S. PATENT DOCUMENTS

| | | | |
|---|---|---|---|
| 2,627,847 | 2/1953 | Clark et al. | 91/369.1 |
| 3,010,542 | 11/1961 | Graber | 188/72.6 X |
| 3,946,837 | 3/1976 | Houser | 188/72.6 X |
| 4,024,713 | 5/1977 | Ueda | 91/369.1 X |
| 5,033,591 | 7/1991 | Price | 188/72.7 X |

*Primary Examiner*—Robert J. Oberleitner
*Assistant Examiner*—Kevin D. Rutherford
*Attorney, Agent, or Firm*—Donald F. Scherer

[57] ABSTRACT

A mechanical/hydraulic brake system has an operator input pedal to initiate braking and brake cooling. The brake return springs establish a reaction force to provide the operator with a "brake feel" or feed-back force. The hydraulic apply forces have a tendency to reduce the feed-back force. A plurality of balance pistons are pressurized simultaneously with the hydraulic apply forces to maintain the feed-back force felt by the operator undiminished.

1 Claim, 7 Drawing Sheets

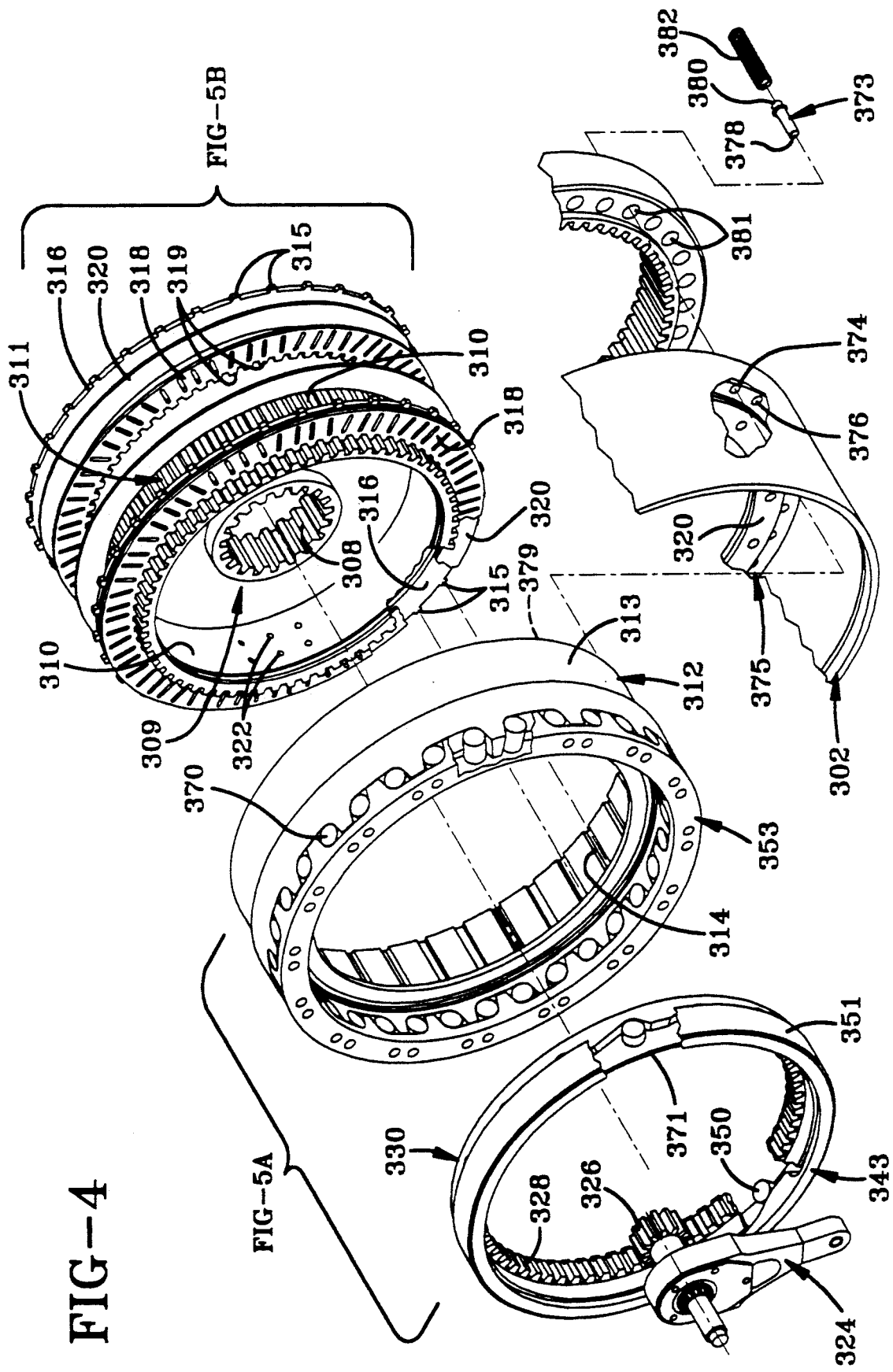

BRAKE APPLY WITH IMPROVED REACTION

TECHNICAL FIELD

The present invention relates generally to the vehicular braking systems. More particularly, the present invention relates to vehicular braking systems having a mechanical/hydraulic apply mechanism. Specifically, the present invention relates to vehicular braking systems that provide a feed-back force to the operator that is appropriate to the braking action.

BACKGROUND OF THE INVENTION

In many track-laying vehicle brake systems, both mechanical and hydraulic brake apply mechanisms are utilized. Although there are such integrated systems which apply the mechanical and the hydraulic apply simultaneously, typically, integrated braking systems sequence the mechanical apply in advance of the hydraulic apply. The mechanical apply portion generally utilizes a cam mechanism to provide an increased mechanical advantage between the operator and the brake apply piston. When the hydraulic apply portion is brought into effect, the feed-back from the mechanical apply portion is generally reduced to a significant degree. In fact, the reduction is of sufficient magnitude that the operator will feel a change in the reaction force sensed by his foot on the brake pedal.

When faced with a severely reduced tactile feed-back, the tendency of the operator is to apply more pressure to the brake pedal. The application of more pressure to the foot pedal results in increased deceleration which may bring the vehicle to a halt sooner than desired by the operator. Experienced operators are familiar with the brake systems in the vehicles they are driving, and such foreknowledge of the disadvantages associated with a particular vehicle mentally prepares the operator to expect apparently inappropriate changes in the tactile feed-back force supplied by the foot pedal. However, even the most experienced operator can react inappropriately when subjected to stress.

SUMMARY OF THE INVENTION

It is, therefore, a primary object of this invention to provide an improved, tactile feed-back force mechanism in a mechanical brake apply mechanism wherein a hydraulic force is applied to the mechanical system in order to balance the reaction forces.

It is another object of the present invention to provide an improved brake apply system, as above, wherein a mechanical/hydraulic brake apply mechanism is operated to engage the vehicle brakes and the application of hydraulic force to the brakes is also supplied to reaction pistons operating within the mechanical apply system.

It is a further object of the present invention to provide an improved brake system, as above, wherein the mechanical apply portion of the mechanical/hydraulic brake apply system operates a cam ramp portion which energizes a plurality of ball, or roller, members that, in turn, energize the brake piston—the hydraulic force applied to the brake piston applying a feed-back force on the ramp mechanism by virtue of one or more hydraulically actuated pistons that are operable against the ramp member to maintain a substantially constant reaction force therein.

These and other objects of the invention, as well as the advantages thereof over existing and prior art forms, which will be apparent in view of the following detailed specification, are accomplished by means hereinafter described and claimed.

In general, the present invention seeks to maintain a realistic, tactile reaction load at the operating pedal such as that initially presented by the brake return springs, even when the hydraulic apply forces are added to the system. Generally, a ball and ramp mechanism is utilized in the brake system to provide the mechanical apply force from the operator input to the brake apply piston. When the sequentially applied hydraulic assist is applied, the reaction force on the ramps has heretofore been significantly reduced. This reduction in the reaction force results in a marked decrease to the tactile feed-back signal felt by the operator through the brake pedal.

With the present invention a plurality of reaction pistons are added to the system which will provide a force on the reaction ramps, that force being substantially equal to the brake return spring force. These reaction pistons are actuated, or pressurized, in response to the hydraulic portion of the brake being actuated. The size of the reaction pistons and the pressure within the system is designed to create a balancing force. The balancing force will be substantially equal in magnitude to the force returned by the brake return springs. This result is accomplished by urging the ramp of the mechanical apply system axially toward the balls as the brakes are hydraulically applied. The balls react to the newly created ramp force by continuing the feed-back force to the foot pedal. Because the balancing force is substantially equal to the return spring force, the force at the apply cam is unchanged and the driver will sense no difference in pedal effort.

The present invention is described in conjunction with one exemplary embodiment of a feed-back force mechanism for a mechanical brake apply system. The exemplary feed-back force mechanism is described in detail without attempting to show all of the various forms and modifications in which the invention might be embodied; the invention being measured by the appended claims and not by the details of the specification.

BRIEF DESCRIPTION OF THE DRAWINGS

FIG. 4 is an enlarged, partially exploded perspective of the brake apply assembly depicted in FIGS. 2 and 3 removed from the housing, and with selected components of the brake apply assembly disposed in their juxtaposed, operative relationship;

DESCRIPTION OF AN EXEMPLARY EMBODIMENT

Figure 1:
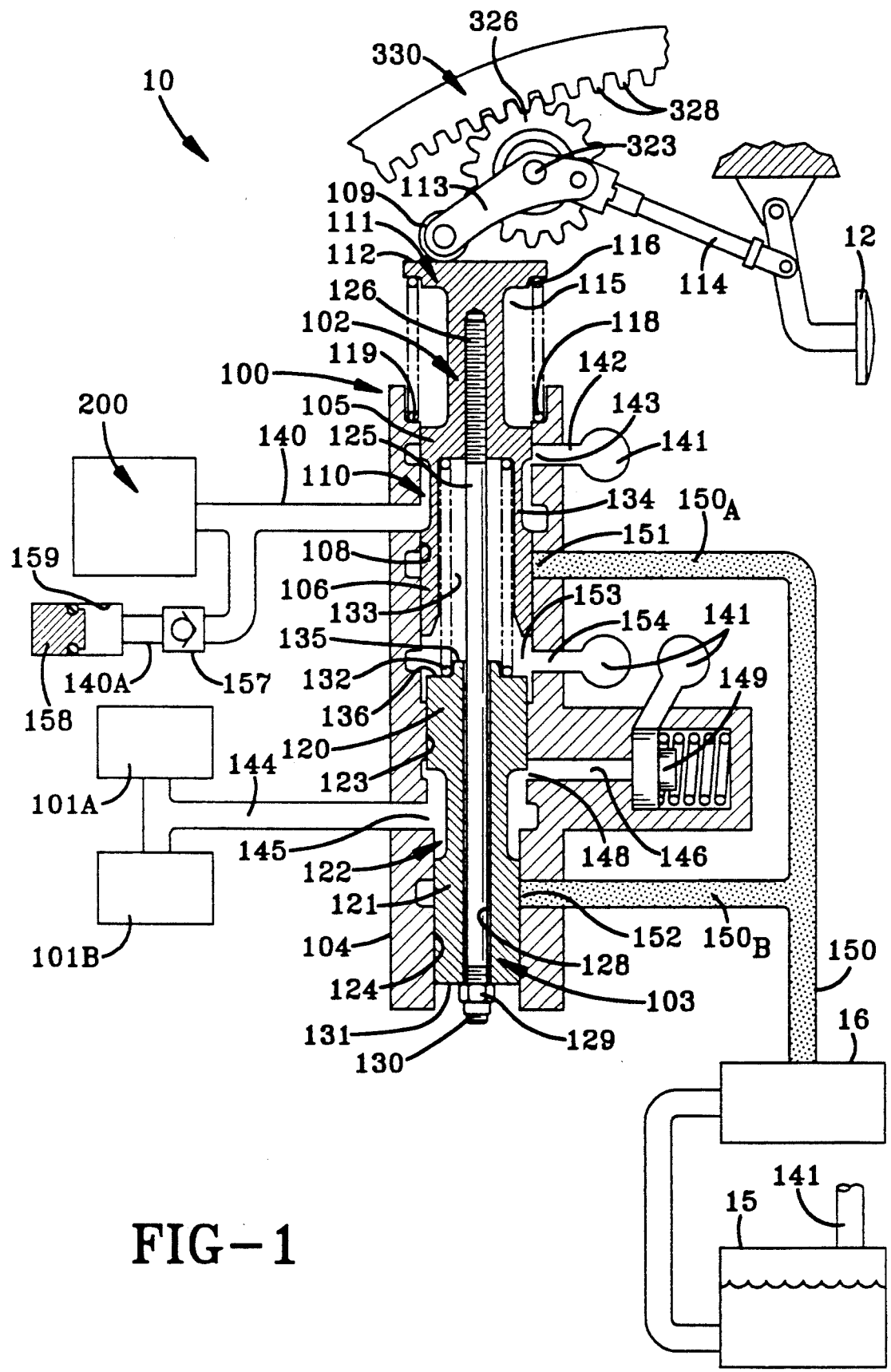
FIG. 1 is a schematic drawing representing the major components of a hydraulically and/or mechanically actuated vehicular braking mechanism embodying the concepts of the present invention.

One representative form of a brake cooling and control system embodying the concepts of the present invention is designated generally by the numeral 10 on the accompanying drawings. The representative brake cooling portion of the system 10, schematically depicted in FIG. 1, may employ a brake apply valve 100 that sequentially stages the flow of coolant to the brake packs (hereinafter shown and described in conjunction with FIGS. 2 and 3) upon initial depression of the brake pedal 12. The brake apply valve 100 also controls the flow of fluid which effects hydraulic actuation of the vehicular brake packs 11 in response to continued depression of the brake pedal 12. The structural description, as well as the aforesaid functions, of the brake apply valve 100 will be hereinafter described in detail.

The brake cooling portion of system 10 also employs a conventional brake coolant valve 200. The brake coolant valve 200 directs the actual flow of the coolant fluid to the brake packs 11. The brake coolant valve 200 may be any of the many conventional valving mechanisms well known to the art for this purpose, and as such a detailed description of a brake coolant valve will not be provided herein.

Brake Apply Valve

Turning now to an explanation of a brake apply valve 100, it must be understood that the brake apply valve 100 controls the application of pressurized hydraulic fluid, such as oil, to the cylinders 101 which operate the brake packs 11 of a vehicle. The brake apply valve 100 also provides a brake apply signal pressure to operate a brake coolant valve 200 which, in turn, controls the application of a coolant—normally cooled hydraulic fluid available from the same source as the hydraulic fluid flowing to, or through, the brake apply valve 100—to the engageable torque transfer device employed by the brake packs 11 of the vehicle.

The brake apply valve 100 employs a pair of axially aligned, and spaced, first and second spool members 102 and 103 that are received within a housing 104 for axial translation. The first spool member 102 has a pair of axially spaced, first and second cylindrical lands 105 and 106, respectively, of equal diameter which slidingly engage a first, cylindrical, interior wall portion 108 of the housing 104 to define a brake apply signal chamber 110 between the lands 105 and 106.

The first spool member 102 has a head portion 111, the outwardly directed face 112 of which may be engaged by a low friction roller presented from an actuating arm 113. The roller 109 applies a displacing force to the spool member 102 in response to the application of force to the brake pedal 12 by the operator. When the actuating arm 113 is mechanical, as depicted in the drawings, it may be mounted for rocking action in response to depression of a brake pedal 12 by the operator of the vehicle. The connection between the brake pedal 12 and the actuating arm 113 may be accomplished by link means, such as shown at 114. The actuating arm 113 may, as shown, be mounted on an extension of the apply shaft 323, that is more fully shown and described in conjunction with the mechanical and hydraulic apply system 300 depicted in FIG. 2, or the actuating arm 113 may be connected by other suitable force transfer systems to the apply lever assembly 324.

The head portion 111 of the first spool member 102 may be annularly recessed, as at 115, to present an annular rim 116 that is engaged by a compression, return spring 118 which acts between the opposed, annular rim 116 and a shelf 119 presented from the housing 104. The return spring 118 applies a biasing resistance to translation of the first spool member 102, and that resistance may be reflected against depression of the brake pedal 12 in order to provide a slight tactile feed-back to the operator. Moreover, the return spring 118 tends to maintain the first spool member 102 in, or to return the first spool member 102 to, the unactuated state depicted in FIG. 2.

The second spool member 103 has a pair of axially spaced, first and second cylindrical lands 120 and 121 of unequal diameter. The lands 120 and 121 are slidably disposed in sealing engagement with a stepped diameter bore in the housing 104. Specifically, the lands 120 and 121 cooperate with the interior of the housing 104 to define a brake apply chamber 122 therebetween. The first land 120, which is of greater diameter than the second land 121, slidingly engages a second, cylindrical, interior wall portion 123 presented from the housing 104, and the second land 121 slidingly engages a third, cylindrical, interior wall portion 124 presented from the housing 104. The functional purpose of the differential areas presented to the brake apply chamber 122 by the first and second lands 120 and 121, respectively, will be hereinafter more fully described.

A connecting rod 125 is anchored in the first spool member 102, as by the threaded attachment 126, and the connecting rod 125 extends slidingly through an axial bore 128 in the second spool member 103 to terminate in a retaining cap 129 that may also be secured to the connecting rod 125, as by the threaded attachment 130. The retaining cap 129 engages one end face 131 on the second spool member 103 to delineate the limit to which the second spool member 103 can separate axially from the first spool member 102.

A regulating compression spring 132 is interposed between the first and second spool members 102 and 103. As depicted, the interior of the first spool member 102 may be axially recessed, as at 133, such that the second land 106 is supported from a skirt portion 134. The regulating spring 132 is received within the axial recess 133 and extends axially outwardly therefrom to engage a centering pedestal 135 that extends axially outwardly from the other end face 136 of the second spool member 103. The functional operation achieved by having the regulating spring 132 continuously bias the two spool members 102 and 103 apart will also be hereinafter more fully described.

The unactuated disposition of the components in the brake apply valve 100 is determined by the unopposed biasing action of the return and regulating springs 118 and 132. In the unactuated state of the brake apply valve 100 the brake signal chamber 110 communicates with the brake coolant valve 200 by virtue of a brake apply signal feed conduit 140, and the brake signal chamber 110 also communicates with the hydraulic return system 141 through an exhaust conduit 142. Specifically, the exhaust conduit 142 opens to the brake signal chamber 110 through an exhaust port 143. In the unactuated state of the brake apply valve 100, therefore, the brake apply signal chamber 110 provides a path by which the hydraulic fluid which actuates the brake coolant valve 200 can enter the hydraulic return system 141 to deactivate the brake coolant valve 200 and thereby terminate the flow of cooling fluid to the brake packs 11.

In the unactuated state of the brake apply valve 100, the brake apply chamber 122 communicates with the brake cylinders 101A and 101B by virtue of a brake apply feed conduit 144. The feed conduit 144 opens to the brake apply chamber 122 through an outlet port 145. The brake apply chamber 122 also communicates with the hydraulic return system 141, but through a second exhaust conduit 146 that opens to the brake apply chamber 122 through an exhaust port 148. The exhaust conduit 146 includes a check valve 149 which allows the actuating pressure to be relieved from the brake cylinders 101 but which precludes the brake cylinders 101 from emptying. In fact, the check valve 149 maintains a minimum pressure of approximately 1-2 p.s.i. in the brake cylinders 101 at all times. This allows for virtually instantaneous response by the brake cylinders 101 upon the application of actuating pressure through the brake apply valve 100.

In the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified it shall be referenced by virtue of a letter suffix employed in combination with the numerical designation utilized for general identification of that structural member, component or arrangement. Thus, there are at least two brake cylinders which are generally identified by the numeral 101, but the specific, individual brake cylinders are, therefore, identified by the alphanumeric designations 101A and 101B in the specification and on the drawings. When two quite similar, or even identical, components are closely related to a third component, the two similar components shall be identified by the same numerical designation as the component to which they are related, except that the similar components shall be referenced by virtue of a letter subscript employed in combination with the numerical designation utilized for identification of the related component. These same suffix conventions shall be employed throughout the specification.

As previously noted, the source of hydraulic fluid employed to actuate the brakes may also be the source of the fluid employed to cool the brakes, and that fluid may be stored in a reservoir 15 that is fed by the hydraulic return system 141. A pump 16 is generally employed to supply hydraulic fluid from the reservoir 15 to the brake apply valve 100 at the desired mainline pressure. As shown, the pressurized hydraulic fluid from the pump 16 is fed into the brake apply valve 100 by branches $150_A$ and $150_B$ of a supply conduit 150. In the unactuated state of the brake apply valve 100, pressurized hydraulic fluid is not provided access to either the brake signal chamber 110 or the brake apply chamber 122. Instead, the second land 106 on the first spool member 102 blocks the inlet port 151 by which the first branch conduit $150_A$ opens through the first, cylindrical, interior wall portion 108 of the housing 104 selectively to feed the brake signal chamber 110. Similarly, the second land 121 on the second spool member 103 blocks the inlet port 152 by which the second branch $150_B$ opens through the third, cylindrical, interior wall portion 124 of the housing 104 selectively to communicate with the brake apply chamber 122.

When the vehicle operator initially depresses the brake pedal 12 the roller 109 on the actuating arm 113 applies a force against the outwardly directed face 112 on the head portion 111 of the first spool member 102. The force applied by the actuating arm 113 translates the first spool member 102. When that force is sufficient to overcome the biasing action of the return spring 118. As the first spool member 102 is thus translated, the first land 105 thereon blocks the exhaust port 143, thereby closing communication between the brake signal chamber 110 and the hydraulic return system 141. That same translation of the first spool member 102 also translates the second land 106 away from the inlet port 151 to permit communication between the first branch $150_A$ and the brake signal chamber 110. Mainline hydraulic pressure is thereupon transmitted through the brake signal chamber 110 and the brake apply signal feed conduit 140 to open the brake coolant valve 200 and allow cooled hydraulic fluid to bathe, and cool, the brake packs in a conventional manner.

Any hydraulic fluid which may inadvertently accumulate within the recess 133, or the space 153 between the first and second spool members 102 and 103, continuously empties into the hydraulic return system 141 through the third exhaust conduit 154. As the first spool member 102 translates in response to depression of the brake pedal 12, the connecting rod 125 will slide along the axial bore 128 which extends through the second spool member 103, and only the biasing action of the regulating spring 132 will effect translation of the second spool member 103 toward the then displaced retaining cap 129 that determines the extent to which the second spool member 103 can move axially away from the first spool member 102.

The regulating spring 132 initially translates the second spool member 103 such that the first land 120 thereon closes the exhaust port 148 by which the exhaust conduit 146 opens through the second cylindrical interior wall portion 123, thereby closing the brake apply chamber 122 to the hydraulic return system 141. Continued translation of the second spool member 103 translates the second land 121 thereon to open the inlet port 152 to permit the introduction of pressurized hydraulic fluid from the second supply branch $150_B$ into the brake apply chamber 122. The foregoing description delineates an arrangement wherein an "underlap" exists as to the spacing of the lands 120 and 121 relative to the spacing of the respective ports 148 and 152 with which the lands 120 and 121 interact.

It is also possible to space the lands 120 and 121 relative to the ports 148 and 152 such that they are "line-on-line." That is, the lands 120 and 121, and/or the ports 148 and 152, may be spaced such that at the instant one port closes, the other port is opening. Finally, it is possible to effect a disposition which constitutes an "overlap." In an overlap disposition the land 121 would open port 152 just prior to the closure of port 148 by land 120.

These three relationships of the lands to the ports are well known to the art, and they are mentioned herein merely to establish that the brake apply valve will operatively accommodate any of the three relationships to accomplish any of the objectives achieved by those three relationships.

Because the check valve 149 does not permit either the brake cylinders 101 or the brake apply feed conduit 144 to empty, the pressurized fluid introduced into the brake apply chamber 122 is applied virtually instantaneously to the brake cylinders 101 through the brake apply feed conduit 144. As the downstream pressure within the feed conduit 144 increases, that pressure will be reflected in the brake apply chamber 122 to be applied against the projected areas of the lands 120 and 121 which define the opposed, axial boundaries of the brake apply chamber 122.

Because the projected area of land 120 exposed to the brake apply chamber 122 is greater than the projected area of land 121 exposed to the brake apply chamber 122, the hydraulic pressure within the brake apply chamber 122 acts on that differential area to create a force that moves the second spool member 103 against the biasing action of the regulating spring 132. The displacement of the second spool member 103 toward the first spool member 102 will depend upon the relative biasing force of the regulating spring 132 in comparison to the differential force applied to the second spool member 103 by the pressure of the hydraulic fluid with the brake apply chamber 122.

As long as the differential force exceeds the biasing action of the regulating spring 132, the second spool member 103 will be urged toward the first spool member 102, even to the point of opening the exhaust port 148 which allows the fluid within the brake apply chamber 122 to exit into the hydraulic return system 141. However, as the pressure within the brake apply chamber 122 falls, the differential force acting on the opposed lands 120 and 121 of the second spool member 103 will be overcome by the biasing action of the regulating spring 132 to close the exhaust port 148 and reopen the second inlet port 152.

It must be appreciated that the translated location of the first spool member 102 directly controls the force which need be applied to the regulating spring 132 by the second spool member 103 in order to effect communication between the brake apply chamber 122 and either the hydraulic return system 141 or the supply branch 150$_B$. Hence, the greater the travel applied by the operator to effect translation of the first spool member 102, the greater will be the brake apply pressure required in the feed conduit 144 to open the exhaust port 148 by which to effect communication with the hydraulic return system 141.

As a result, the apply pressure directed to the brake cylinders 101 through the brake apply valve 100 is regulated in response to the amount of displacement travel applied by the vehicle operator to the foot pedal 12. In addition, the operator is continuously supplied with tactile feed-back through the contact of his foot with the pedal 12. Such tactile feed-back has been found to enhance the operator's visual observation of the vehicular speed reduction in response to his application of foot pressure upon the pedal 12.

Figure 2:
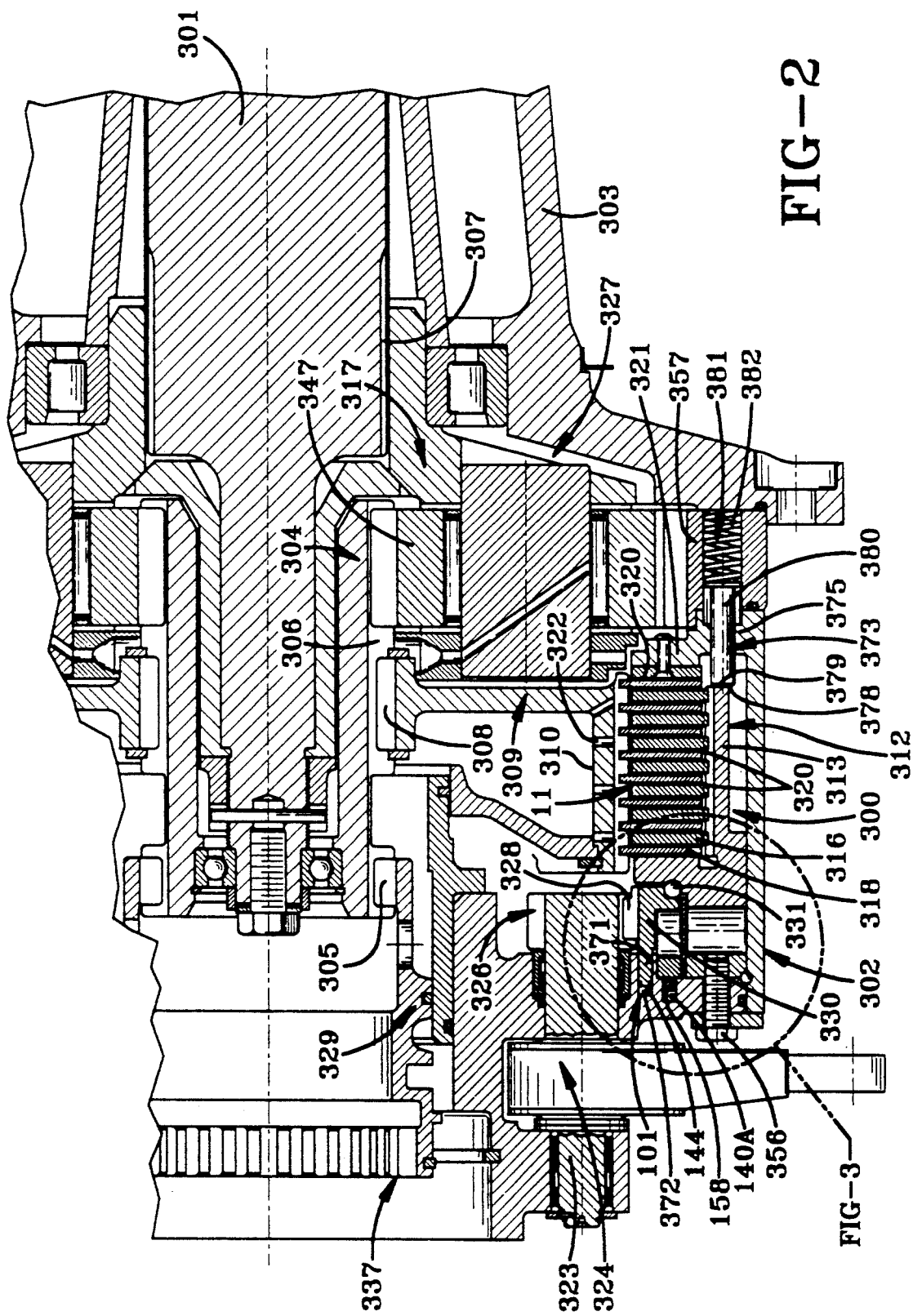
FIG. 2 is a schematic cross section taken axially through that portion of a case which houses a brake assembly that acts upon the output shaft in proximity to its connection with an axle assembly of a vehicle, the cross section depicting a representative brake apply assembly employing opposed camming ramps to effect the mechanical actuation of the brake pack and an actuating cylinder to effect hydraulic actuation of the brake pack, the mechanical and hydraulic actuating systems being compatibly cooperative.
Figure 3:
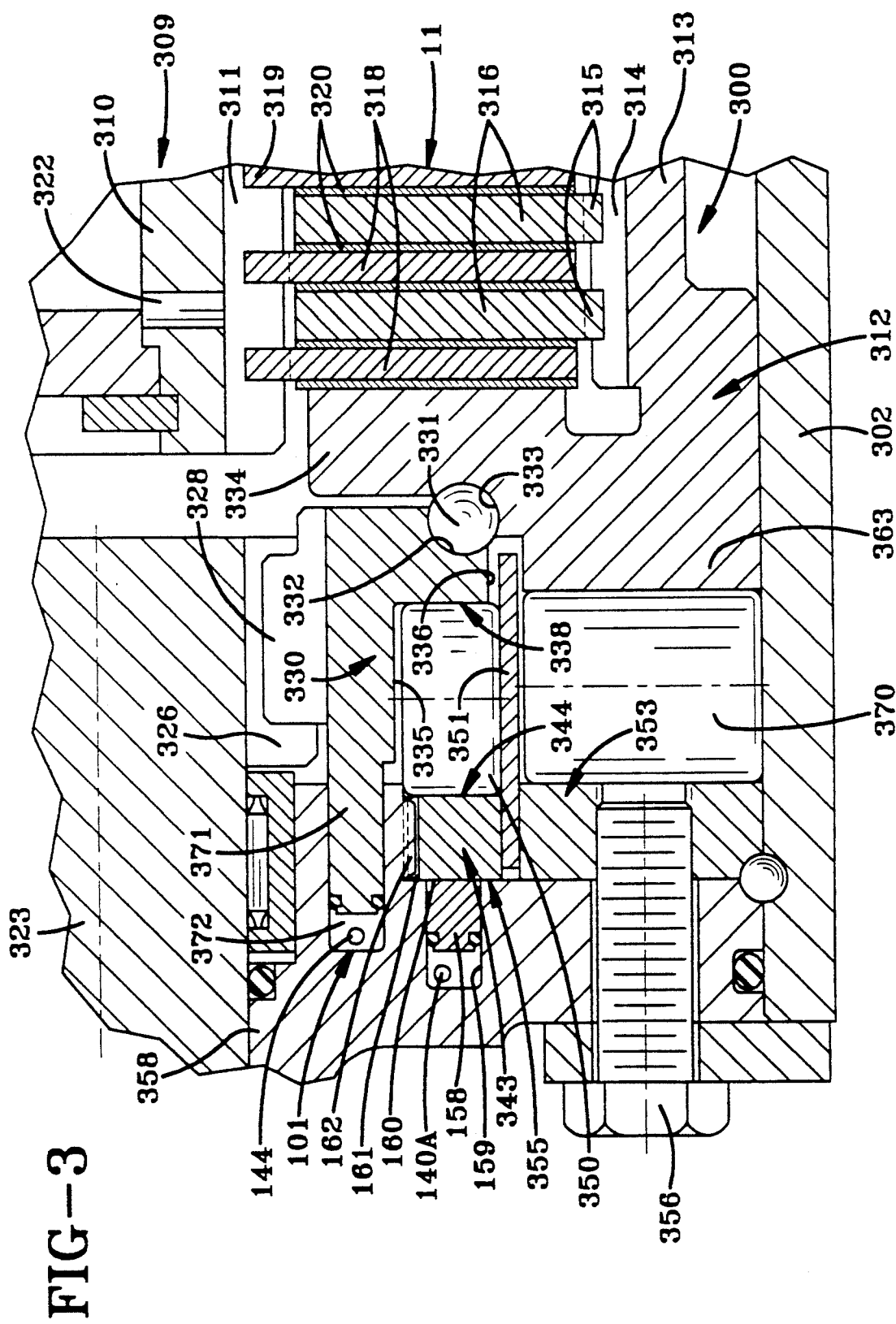
FIG. 3 is an enlarged area of that portion of the schematic cross section of FIG. 2 defined generally by the circle designated as "FIG.-3" therein.

The brake signal feed conduit 140 is connected through a conventional regulator valve member 157 in branch conduit 140$_A$ to one or more balance pistons 158 which are disposed in appropriate chambers 159 provided in the housing 302 of the brake assembly, as best depicted in FIGS. 2 and 3. The function of the balance pistons 158 will be explained in more detail with the description of the brake structure.

Brake Apply Ramp

A combined, mechanical/hydraulic brake apply assembly 300—which may be incorporated in cooperation with the brake cooling system 10—is depicted in FIGS. 2 through 6. The brake apply assembly 300 effects the application of brake apply force to the brake packs in response to both mechanically and hydraulically generated forces. The mechanically and hydraulically generated forces may be individually applied, simultaneously applied or applied in selected sequential and/or simultaneous combinations. The brake packs are operatively associated with the output shafts 301 of a transmission or vehicle. The details of the vehicle and transmission, being well known to the art, are not depicted in the drawings attached hereto. The brake assembly 300 is received within a brake housing 302 that is typically located linearly adjacent the casing 303 so that rotation of the output shaft 301 can be transmitted to the brake apply assembly 300 received within the brake housing assembly 302. One may, if desired, combine the brake housing 302 with the transmission casing 303, but for simplification of the present explanation they will be deemed to be contiguous, but separate.

The shaft 301 is connected by a spline 307 to a carrier assembly 317 of a planetary gear set 327. The planet carrier assembly 317 has pinion gears 347 which mesh with a ring gear 357 and a sun gear. The sun gear is identified by the spline-teeth 306 formed on a sun gear shaft 304. The sun gear shaft 304 provides an input member for the planetary gear set 327. A sleeve shaft 329 is drivingly connected to the sun gear shaft 304 by teeth 305 and is connectable through teeth 337 to a conventional drive shaft from a transmission, not shown. The sleeve shaft 329 is movable axially to permit ease of connection between the planetary gear set 327 and the transmission in a well known manner. The spline-teeth 306 on the sun gear shaft 304 also operatively engage the splines 308 on a hub member 309. A radially outer rim 310 of the hub member 309 is provided with a plurality of axially extending splines 311 operatively to engage the brake pack 11. Actuation of the brake pack 11, as hereinafter explained, will provide a direct connection between the casing 303 and the sun gear shaft 304. This will create a braking effect on the carrier assembly 317, and therefore shaft 301, which will provide slowing of the vehicle.

The brake pack is operatively connected between the hub member 309 and a brake apply annulus 312. Specifically, the radially inner surface on the skirt portion 313 of the brake apply annulus 312 may incororate splines, in the nature of axial slots, as at 314, to receive the mating splines, in the nature of tangs, 315 of the first, annular torque plates 316 and thereby assure that the first torque plates 316 are not relatively rotatable with respect to the brake apply annulus 312. To assure that the interaction between the brake apply annulus 312 and the splines 315 is sufficient to withstand the loading to which the splines 315 may be subjected, a plurality of axially oriented splines, or slots, 314 are employed at circumferentially spaced intervals about the radially inner surface on the skirt portion 313 of the brake apply annulus 312, and the first torque plates 316 are provided with a sufficient number of tang splines 315 to interact with those slot splines 314, as is well known to the art. For simplification only two torque plates 316 are depicted in FIG. 3, but as should be appreciated, a plurality of such plates 316 may be stacked in operative relation with the hereinafter described second torque plates 318, as is also well known to the art. As depicted in FIG. 2, seven, first—or drive—torque plates 316 are interleaved with eight, second—or reaction—torque plates 318.

The splines 311 on the radially outer rim 310 of the hub member 309 are also spaced at circumferential intervals to receive the several splines, in the nature of tangs, 319 which extend radially inwardly from each of the plurality of second, annular torque plates 318 and thereby assure that the second torque plates 318 will not rotate relative to the hub member 309, and thus the transmission output shaft 301, as is also well known to the art.

Annular friction disks 320 are preferably secured to one of the successive first and second torque plates 316 and 318, respectively. By thus securing the friction disks 320 to only one of the torque plates 316 or 318 the chance of having any friction disk 320 directly engage another friction disk 320 is obviated. It is, of course, also possible to apply one friction disk 320 to only one side of each torque plate 316 and 318. In this arrangement care must be exercised to assure that only one friction disk is sandwiched between successive torque plates 316 and 318 in order to preclude direct engagement between friction disks 320.

As previously explained, a brake apply valve 100 provides a brake apply signal pressure to operate a brake coolant valve 200 which, as previously mentioned, controls the application of a coolant—normally cooled hydraulic fluid available from the same source as the hydraulic fluid flowing to, or through, the brake apply valve 100—to the torque transfer devices employed in each brake pack 11. In the embodiment depicted, the torque plates 316 and 318 as well as the friction disks 320 constitute a brake pack 11. A plurality of ports 322 extend radially through the rim 310 of the hub member 309 to dispense the cooling fluid radially outwardly over the brake pack.

Figure 5A:
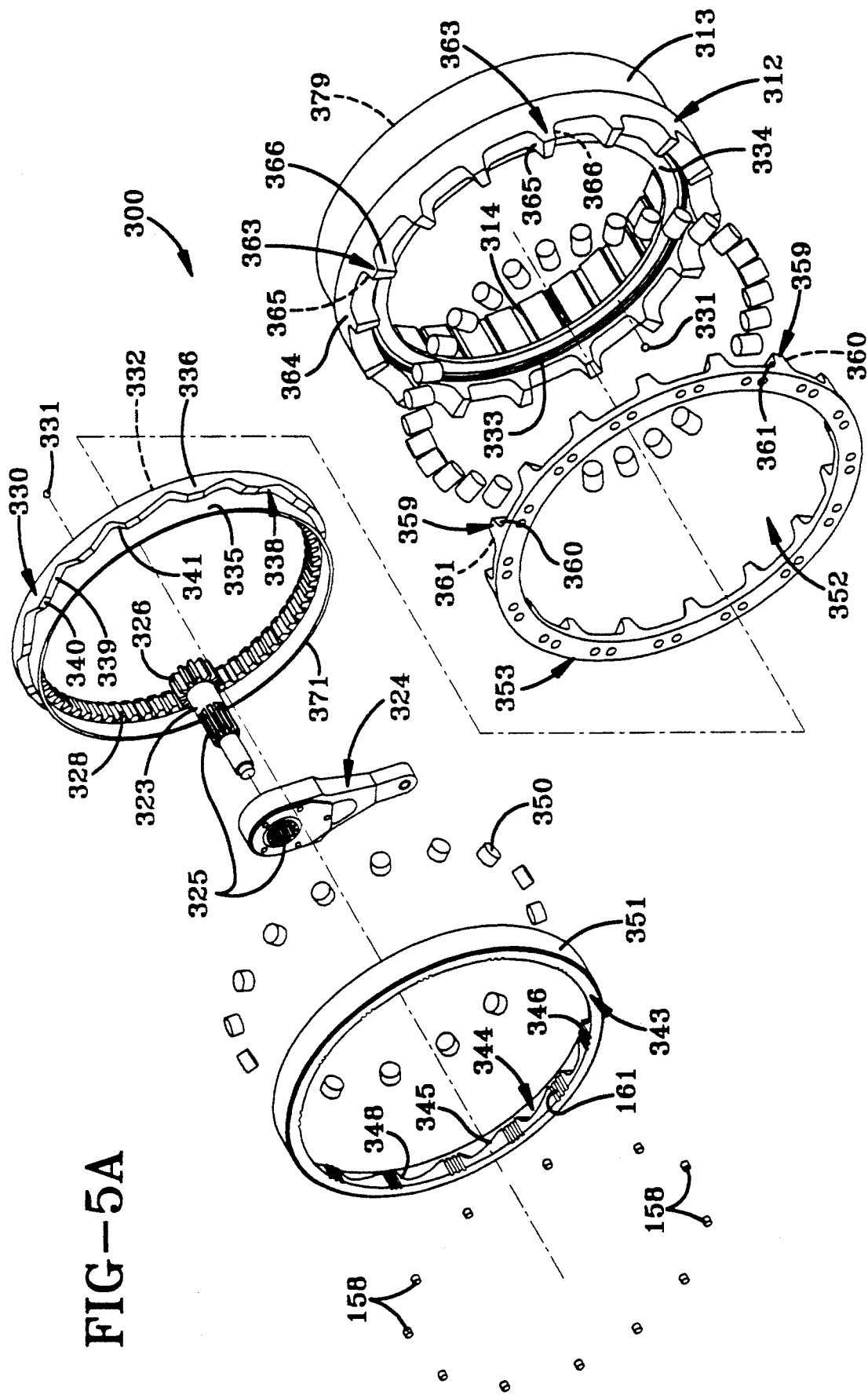
FIG. 5A is an exploded perspective of that portion of FIG. 4 designated as "FIG.-5A", FIG. 5A depicting a portion of the brake apply assembly removed from the housing.
Figure 5B:
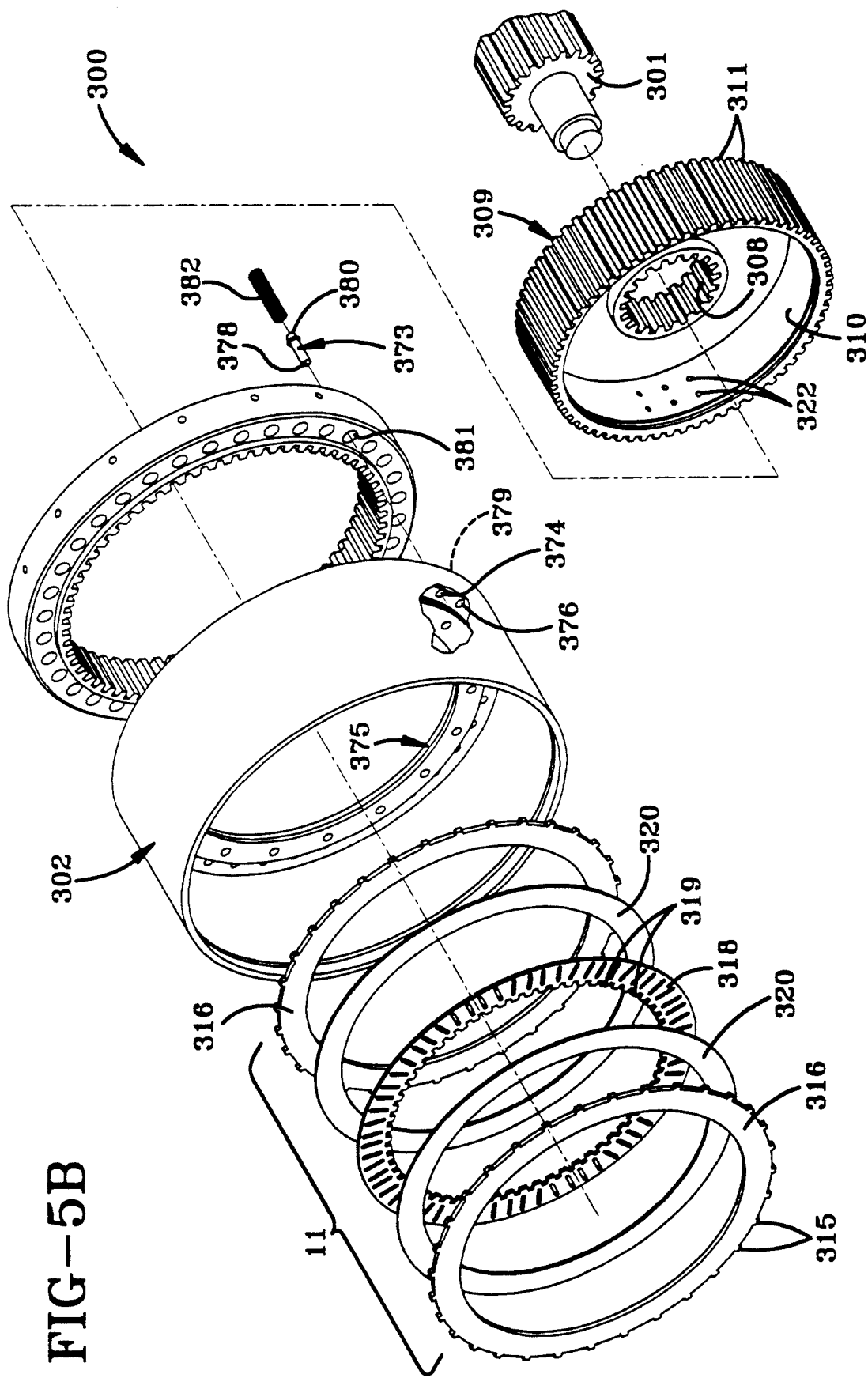
FIG. 5B is an exploded perspective of that portion of FIG. 4 designated as "FIG.-5B", FIG. 5B depicting another portion of the brake apply assembly removed from the housing; and, FIG. 6 is a schematic, elevational view representing a portion of the brake apply assembly in order to present a visual depiction of the balance pistons in their interaction with the mechanical/hydraulic apply mechanism.
Figure 6:
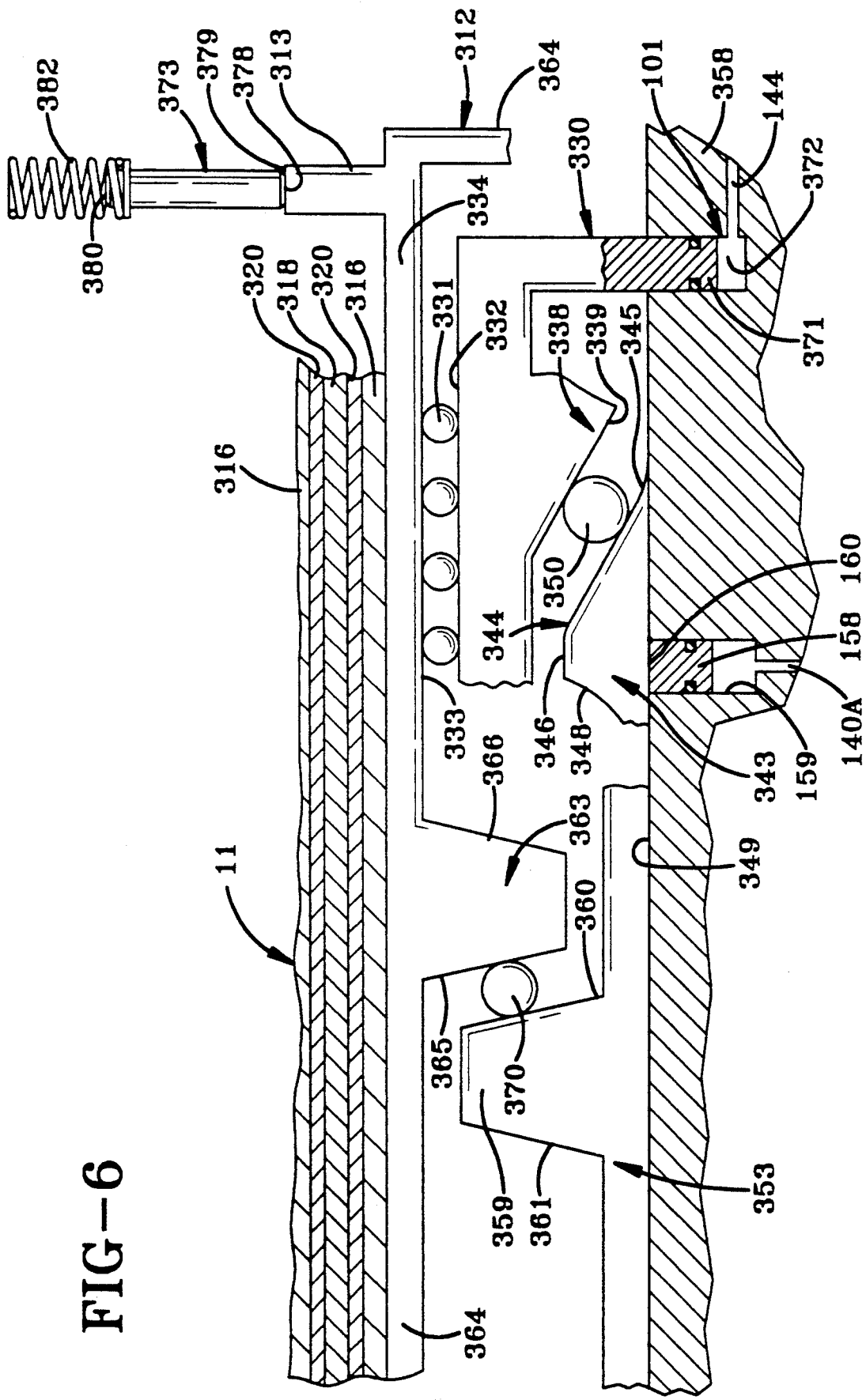

Focusing more specifically on the brake apply assembly 300, which includes the brake apply annulus 312, the apply shaft 323 is rotated—either directly with the actuating arm 113 (FIG. 1) or by an apply lever assembly 324 (FIG. 2) which responds to the application of pressure applied by the operator of the brake pedal 12 of the vehicle. As shown, the apply lever assembly 324, if employed, may be operatively secured to the apply shaft 323, as by a spline connection 325 (FIG. 5A). In either event, a spur gear 326 is provided on the inboard end of the apply shaft 323 meshingly to engage the teeth 328 presented on the radially inner surface of an annular apply cam member 330. The axial orientation of the teeth on the spur gear 326, as well as the axial orientation of the teeth 328 on the annular apply cam member 330 permit relative axial movement therebetween, even while the teeth remain in meshing engagement. The ability of the annular apply cam member 330 to be readily displaced axially with respect to the apply shaft 323 while the two members remain in meshing engagement is quite important to the operation of the brake apply assembly 300 utilizing a toothed input mechanism, as will hereinafter become more fully apparent.

A plurality of ball bearings 331 are interposed between the race 332 presented from the annular apply cam member 330 and the opposed race 333 provided radially inwardly directed flange 334 on the brake apply annulus 312. As will be hereinafter more fully explained, the ball bearings 331 will effect axial force transfer between the annular apply cam member 330 and the brake apply annulus 312, even though those two components are relatively rotatable. As will be hereinafter described, axial translation of the annular apply cam member 330, for any reason, will, through the application of axial force by the ball bearings 331, tend to effect axial translation of the brake apply annulus 312.

The radially outwardly directed surface of the apply cam member 330 is defined by radially offset, cylindrical first and second surfaces 335 and 336, respectively. A camming surface, indicated generally by the numeral 338, extends radially between the first offset surface 335 and the second offset surface 336. The camming surface 338 is comprised of a plurality of axially inclined apply ramps 339—fifteen in the embodiment depicted—disposed between null peaks 340 and return surfaces 341 such that each apply ramp 339 is inclined at an angle with respect to a circumferential frame of reference 342.

An annular reaction cam member 343 is disposed in axial opposition to the apply cam member 330. The reaction cam member 343 presents an axially disposed cam surface, identified generally by the numeral 344. The reaction cam surface 344 also comprises a plurality of axially inclined, reaction apply ramps 345—fifteen in the embodiment depicted—disposed between null peaks 346 and return surfaces 348 such that each reaction apply ramp 345 is also inclined at an angle with respect to a circumferential frame of reference 349 which is disposed in parallel relation to the circumferential frame of reference 342 on the annular apply cam member 330. One apply roller 350 is disposed between each of the opposed apply ramps 339 and 345 on the apply cam member 330 and the reaction cam member 343, respectively, for a purpose more fully hereinafter described.

A containing skirt 351 extends circumferentially about the reaction cam member 343. The reaction cam member 343, with the containing skirt 351 positioned circumferentially thereabout, is received within the central opening 352 through a response ring 353. A plurality of fastening means in the nature of machine bolts 356 (FIGS. 2 and 3) extend through the end wall 358 of the brake housing 302 to be anchored in the response ring 353, thereby securing the reaction assembly 355 to the brake housing 302.

The response ring 353 presents a plurality of circumferentially spaced, axially outwardly extending lobes 359. As depicted, sixteen lobes 359 would represent a typical embodiment. The opposed sides of each successive lobe 359 presents preferably planar self-energizing ramps 360 and 361 that are each inclined at an angle with respect to an axial frame of reference 362, as represented. An equal number of virtually identical lobes 363 extend axially outwardly at circumferentially spaced locations about the outer rim 364 of the brake apply annulus 312. The opposed sides of each successive lobe 363 also presents preferably planar self-energizing ramps 365 and 366 that are also inclined at an angle with respect to an axial frame of reference 368 thereon which is substantially parallel with the axial frame of reference 362 on the response ring 353. There are preferably the same number of lobes 363 on the brake apply annulus 312 as the number of lobes 359 on the response ring 353, although the lobes 359 on the response ring 353 are circumferentially displaced with respect to the lobes 363 on the brake apply annulus 312. This circumferential displacement positions the self-energizing ramp 360 on each lobe 359 in opposition to the self-energizing ramp 365 on lobe 363. Similarly, the self-energizing ramp 361 on lobe 359 is thereby disposed in opposition to the self-energizing ramp 366 on lobe 363. A roller 370 is disposed between each pair of opposed self-energizing ramps 359 and 365 as well as each pair of opposed self-energizing ramps 361 and 366 on the successive lobes 359 and 363.

The annular piston 371 extends axially outwardly from the apply cam member 330 to be received within the mating, annular piston chamber 372 recessed within the end wall 358 of the brake housing 302. A similar piston chamber is provided for that brake apply assembly 300 utilized with each transmission output shaft 301. As previously described, pressurized hydraulic fluid is applied from the brake apply valve 100 to the brake cylinders 101 (represented by the piston chambers 372) through the feed conduit 144.

A plurality of displacement rods 373 are slidably received within a corresponding plurality of bores 374 circumferentially spaced about a support flange 375 that extends radially inwardly from the brake housing 302. The bores 374 may, as shown, alternate with mounting bores 376 which also penetrate the support flange 375. The previously described annular backing plate 321 may also be carried on the support flange 375.

The distal end 378 of each displacement rod 373 extends outwardly from the support flange 375 to engage the end face 379 on the skirt portion 313 of the brake apply annulus 312. The opposite, or proximal, end 380 of each displacement rod 373 is received within a chamber 381 for axial displacement. The chamber 381 contains means by which to provide a biasing protraction of the displacement rod 373 against the end face 379 on the skirt portion 313 of the brake apply annulus 312. As shown, that means may be the biasing action of a compression spring 382, but for some installations the chamber 381 may serve to receive pressurized hydraulic fluid, the pressure of which will control the force with which the displacement rod 373 acts against axial translation of the brake apply annulus 312.

Operation of the brake apply assembly 300 is initiated when the vehicle operator applies pressure to the brake pedal 12, which effects rotation of the apply shaft 323, either directly—or by virtue of a force transfer means, not shown, to the apply lever assembly 324. Rotation of the shaft 323, and the spur gear 326 secured thereto, rotates the annular apply cam member 330 and forces the apply ramps 339 to drive the apply rollers 350 against the reaction apply ramps 345 on the reaction cam member 343. Because the reaction cam member 343 is fixedly secured to the brake housing 302 in a circumferential direction, the interaction between the apply ramps 339, the apply rollers 350 and the reaction apply ramps 345 translates the annular apply cam member 330 away from the reaction cam member 343 to drive the ball bearings 331 against radially inwardly directed flange 334 on the brake apply annulus 312, thus also axially translating the brake apply annulus 312 to compress the associated brake pack 11 between the flange 334 and the backing plate 321.

As the braking action between the interleaved torque plates 316 and 318 begins to take effect, the torque applied to those torque plates 318 rotating with the transmission output shaft 301 by virtue of the vehicular momentum is reflected back to the brake apply annulus 312. The torque is reflected through the interaction of the splines 315 on the first torque plates 316 with the splines 314 on the skirt portion 313 of the brake apply annulus 312. The resulting torque reaction is not, however, applied to the annular apply cam member 330 inasmuch as the ball bearings 331 isolate the annular apply cam member 330 from rotation of the brake apply annulus 312. To the contrary, the torque feed back to the brake apply annulus 312 does react against those rollers 370 located between the ramps 365 or 366 on the lobes 363 of the brake apply annulus 312 which are, by the reflected torque, rotated toward the opposed ramps 360 or 361 on the lobes 359 presented from the response ring 353. The resulting interaction of the ramps on lobes 359, the rollers 370 and the reaction ramps on lobes 363 effects an additional force on the annular apply cam member 330 away from the reaction cam member 343. This force also serves to drive the ball bearings 331 against the radially inwardly directed flange 334 on the brake apply annulus 312, thus effecting additional axial force on the brake apply annulus 312 to compress the associated brake pack 11 even further. The brake application resulting from the feed-back torque is designated as a self-energizing braking application; its effect is additive to the brake apply force initially generated by rotation of the annular apply cam member 330, and will occur only in the event of a hydraulic malfunction.

The apply system would be designed to impose an equal force to the annular apply cam member 330 associated with each axle, that force being proportional to the pedal force and the linear stroke of the pedal 12. The displacement stroke of the pedal 12 adjusts the total force applied to the brake packs 11 to attain a deceleration rate compatible with the tactile feed back to the vehicle operator through the brake pedal 12. The biasing pressure applied to the proximal end 380 of the displacement rods 373 acts against the mechanical force applied by the self-energization system to assure its release when the pressure applied against the brake pedal 12 by the vehicle operator is release, or reduced.

The biasing force supplied by the springs 382 does not relieve the apply system 300 of any of its load inasmuch as that biasing force is applied to the isolated brake apply annulus 312 and not to the annular apply cam member 330. Hence, the biasing force relieves a portion of the self energizing force at the rollers 370 but does not measurably affect the position of the brake apply annulus 312.

It must be appreciated that if the hydraulic system were to fail, the mechanical system would be opposed by the biasing action of the springs 382, but the vehicle could readily be brought to a stop—although at perhaps a somewhat greater pedal pressure than would normally be required. Finally, holding a vehicle on a grade with the engine off (no hydraulic system assist) would take advantage of the self-energization feature.

As was briefly heretofore mentioned, one or more balance pistons 158 are slidably disposed in chambers 159 provided within the end wall 358 of housing 302. The pistons 158 abut the opposed surface 160 of the reaction cam 343. The reaction cam 343 has a radially inner, splined surface 161 which engages an opposed spline surface 162 formed in the end wall 358 of the housing 302. The spline connection 161 and 162 will permit the reaction cam 343 to move axially but prevent rotary motion of the cam relative to the housing 320. When the hydraulic brake apply begins, which is reflected by the hydraulic pressure in conduits 140 and 144, the piston 371 begins moving axially, and, as can be seen best in FIG. 3, this will relieve the reaction load between the roller 350 and cam surface 344 on the reaction cam 343. When this occurs a reduction in the reaction force at the operator's control pedal would heretofore have been felt. To prevent this change in reaction force, the balance pistons 158 are pressurized by fluid from passage 140 which passes through the branch passage 140$_A$, the regulator valve 157, which emits fluid at a constant pressure, and into the chamber 159. The pressure on the balance pistons 158 is sufficient to replace the reaction force removed, or overcome, by the hydraulic application of the brakes.

The mechanical reaction force felt by the operator at this point is generally equal to the force in the springs 382 and some other minor forces that are present in the system. Because this is a substantially constant force, the pressure on the balance pistons 158 is limited to a constant pressure such that the reaction force felt by the operator from the pure mechanical apply will not vary. The hydraulic brake apply will provide additional feedback forces for the operator and will be proportional to the brake apply pressure in passage 144, which is controlled by the force on spring 132 as modified by the differential areas between the lands 121 and 120. It should thus be apparent that the operator will not have any physical indication that the brake application has changed from a mechanical apply system to a mechanical/hydraulic apply system.

As should now be apparent, the present invention not only teaches that a brake system embodying the concepts of the present invention not only applies a pre-cooling bath to the brake packs as a result of reducing, or releasing, the throttle but also that the other objects of the invention can likewise be accomplished.

I claim:
1. A brake apply control system comprising:
    a mechanical brake apply portion including a reaction member, a mechanical input member and reaction means responsive to said mechanical input member to mechanically apply a brake force resulting in a mechanical input force on said reaction member and a feedback force on said mechanical input member;
    a hydraulic brake apply portion for providing a hydraulic apply signal to a brake apply piston operatively connected with said mechanical input member and operable in response to the brake apply signal to cause a reduction in the mechanical input force on said reaction member and said feedback force;
    a hydraulic balancing means responsive to the apply signal for imposing a balanced force on said reaction member substantially equal to the reduction thereon caused by said apply signal, and said reaction member imposing a feedback force on said mechanical input member in response to the balanced force;
    said reaction means comprising;
    a cam member disposed for axial movement in a fixed housing;
    roller members operatively associated with said cam member for enforcing a reaction force on the mechanical input member; and,
    said hydraulic balancing means includes a plurality of hydraulically actuated piston means disposed adjacent to said cam member for imposing an axial force on said cam member in response to said hydraulic apply signal.

* * * * *